US012781919B2

(12) United States Patent
Sato et al.

(10) Patent No.: US 12,781,919 B2
(45) Date of Patent: Nov. 3, 2026

(54) HIGH-PRESSURE TANK LINER, HIGH-PRESSURE TANK LINER MANUFACTURING METHOD AND HIGH-PRESSURE TANK

(71) Applicants: HONDA MOTOR CO., LTD., Tokyo (JP); Yachiyo Industry Co., Ltd., Sayama (JP)

(72) Inventors: Takaharu Sato, Tokyo (JP); Mikio Ishiyama, Saitama (JP)

(73) Assignees: HONDA MOTOR CO., LTD., Tokyo (JP); YACHIYO INDUSTRY CO., LTD., Sayama (JP)

( * ) Notice: Subject to any disclaimer, the term of this patent is extended or adjusted under 35 U.S.C. 154(b) by 221 days.

(21) Appl. No.: 18/340,287

(22) Filed: Jun. 23, 2023

(65) Prior Publication Data

US 2023/0417366 A1 Dec. 28, 2023

(30) Foreign Application Priority Data

Jun. 27, 2022 (JP) ................................ 2022-102737

(51) Int. Cl.
*F17C 1/16* (2006.01)
*B29D 22/00* (2006.01)
*F17C 1/06* (2006.01)

(52) U.S. Cl.
CPC ............. *F17C 1/16* (2013.01); *B29D 22/003* (2013.01); *F17C 1/06* (2013.01);
(Continued)

(58) Field of Classification Search
CPC . B29D 22/003; F17C 1/06; F17C 1/16; F17C 2201/0109; F17C 2203/0604;
(Continued)

(56) References Cited

U.S. PATENT DOCUMENTS 11,015,761 B1 * 5/2021 Villarreal .................. F17C 1/16
2018/0340655 A1 * 11/2018 Lee ....................... F17C 13/002
(Continued)

FOREIGN PATENT DOCUMENTS

CN 102317054 A 1/2012
CN 112124284 A 12/2020
(Continued)

OTHER PUBLICATIONS

Japanese Office Action dated Sep. 12, 2024 issued in corresponding Japanese application No. 2022-102737; English translation included (8 pages).
Chinese Office Action dated Oct. 1, 2025 issued in corresponding Chinese application No. 202310751367.6; English translation included (14 pages).

*Primary Examiner* — Nathan J Jenness
*Assistant Examiner* — Madison L Poos
(74) *Attorney, Agent, or Firm* — Rankin, Hill & Clark LLP

(57) ABSTRACT

A high-pressure tank liner includes a body portion formed from a cylindrical body, a diameter-expanded part formed into a cylindrical body at the body portion with a larger diameter than an outside diameter of a general part of the body portion, and a staircase portion including stairs and formed at a stepped portion between the general part and the diameter-expanded part of the body portion. A distance from a corner on the diameter-expanded part side of the stepped portion to a peripheral surface of the general part while passing through a corner of each stair constituting the staircase portion is shorter than a lateral width of roving formed from reinforced fibers arranged in such a way as to extend in a circumferential direction of the body portion.

5 Claims, 11 Drawing Sheets

(52) U.S. Cl.
CPC ................. *F17C 2201/0109* (2013.01); *F17C 2203/0604* (2013.01); *F17C 2203/0619* (2013.01); *F17C 2203/066* (2013.01); *F17C 2203/0663* (2013.01); *F17C 2209/221* (2013.01); *F17C 2209/232* (2013.01); *F17C 2221/012* (2013.01); *F17C 2223/0123* (2013.01); *F17C 2270/0184* (2013.01)

(58) Field of Classification Search
CPC ........ F17C 2203/0619; F17C 2203/066; F17C 2203/0663; F17C 2209/221; F17C 2209/232; F17C 2221/012; F17C 2223/0123; F17C 2270/0184; F17C 2203/0612; F17C 2203/0621; F17C 2203/0624
USPC .......................................................... 220/589
See application file for complete search history.

(56) References Cited

U.S. PATENT DOCUMENTS

| | | | | |
|---|---|---|---|---|
| 2020/0096156 | A1 | 3/2020 | Baba | |
| 2020/0332960 | A1 | 10/2020 | Sato et al. | |
| 2021/0372564 | A1 | 12/2021 | Baba | |
| 2022/0170593 | A1* | 6/2022 | Lee | F17C 1/02 |

FOREIGN PATENT DOCUMENTS

| | | | | |
|---|---|---|---|---|
| EP | 2 397 312 | A1 | 12/2011 | |
| JP | H9-72494 | A | 3/1997 | |
| JP | 2019-44937 | A | 3/2019 | |
| JP | 2020-46002 | A | 3/2020 | |
| JP | 2020-128010 | A | 8/2020 | |
| WO | WO-2019131737 | A1 * | 7/2019 | B29C 65/0618 |

* cited by examiner

HIGH-PRESSURE TANK LINER, HIGH-PRESSURE TANK LINER MANUFACTURING METHOD AND HIGH-PRESSURE TANK

CROSS-REFERENCE TO RELATED APPLICATION

This application is based upon and claims priority from the Japanese Patent Application No. 2022-102737, filed on Jun. 27, 2023, the entire contents of which are incorporated herein by reference.

BACKGROUND OF THE INVENTION

1. Field of the Invention

The present invention relates to a high-pressure tank liner, a high-pressure tank liner manufacturing method and a high-pressure tank.

2. Description of the Related Art

A structure constructed by forming a fiber-reinforced resin layer on an outer side of a cylindrical liner (a high-pressure tank liner) made of a synthetic resin has heretofore been known as a so-called high-pressure tank for containing a high-pressure gas (see WO2019/131737, for example). This liner is formed by welding two cylindrical half bodies to each other. Moreover, a welded portion between the half bodies takes on a cylindrical shape with a larger diameter than an outside diameter of a general part of a body portion of the liner. Accordingly, a stepped portion is formed on an outer peripheral surface between the general part and the welded part of the liner.

Meanwhile, in the case of the traditional high-pressure tank (see WO2019/131737), reinforced fiber roving with application of prescribed tension is wound around the liner when forming the fiber-reinforced resin layer on the outer side of the liner. However, the roving wound on the stepped portion of the liner is prone to develop a gap on the general part side of the liner and to cause unevenness of strands that constitute the roving.

SUMMARY OF THE INVENTION

An object of the present invention is to provide a high-pressure tank liner, a high-pressure tank liner manufacturing method and a high-pressure tank, which suppress development of a gap and unevenness of reinforced fibers of a fiber-reinforcement resin layer to be provided on an outer side of a high-pressure tank liner.

A high-pressure tank liner of the present invention for achieving the object is characterized in that the high-pressure tank liner includes: a body portion formed from a cylindrical body; a diameter-expanded part formed into a cylindrical body at the body portion with a larger diameter than an outside diameter of a general part of the body portion; and a staircase portion including stairs and formed at a stepped portion between the general part and the diameter-expanded part of the body portion, a distance from a corner on the diameter-expanded part side of the stepped portion to a peripheral surface of the general part while passing through a corner of each stair constituting the staircase portion is shorter than a lateral width of roving formed from reinforced fibers arranged in such a way as to extend in a circumferential direction of the body portion.

A high-pressure tank liner manufacturing method of the present invention for achieving the object is characterized in that the high-pressure tank liner manufacturing method includes the steps of: joining flanges of a pair of liner half bodies to each other, each liner half body including a body portion formed from a cylindrical body, and the flange formed at an opening on one end side of the body portion; forming a diameter-expanded part of a cylindrical body with a larger diameter than an outside diameter of a general part of the body portion by cutting a joint portion between the flanges of the liner half bodies in a circumferential direction of the cylindrical body; and forming a staircase portion including stairs by cutting a stepped portion formed between the general part and the diameter-expanded part of the body portion, the stepped portion is cut in the step of forming a staircase portion such that a distance from a corner on the diameter-expanded part side of the stepped portion to a peripheral surface of the general part while passing through a corner of each stair constituting the staircase portion is shorter than a lateral width of roving formed from reinforced fibers arranged in such a way as to extend in a circumferential direction of the body portion.

A high-pressure tank of the present invention for achieving the object is characterized in that the high-pressure tank includes: a high-pressure tank liner including a body portion formed from a cylindrical body, a diameter-expanded part formed into a cylindrical body at the body portion with a larger diameter than an outside diameter of a general part of the body portion, and a staircase portion including stairs and formed at a stepped portion between the general part and the diameter-expanded part of the body portion; and a fiber-reinforced resin layer provided in such a way as to cover an outer side of the high-pressure tank liner, reinforced-fiber roving constituting the fiber-reinforced resin layer is disposed in such a way as to be wound around an outer peripheral surface of the high-pressure tank liner around an axis of the high-pressure tank liner, and the roving has a width larger than a distance in the high-pressure tank liner from a corner on the diameter-expanded part side of the stepped portion to a peripheral surface of the general part while passing through a corner of each stair constituting the staircase portion.

According to the present invention, it is possible to provide a high-pressure tank liner, a high-pressure tank manufacturing method and a high-pressure tank, which suppress development of a gap and unevenness of reinforced fibers constituting a fiber-reinforcement resin layer when forming the fiber-reinforcement resin layer on an outer side of a high-pressure tank liner.

DETAILED DESCRIPTION OF THE EMBODIMENT

Next, a mode for carrying out the present invention (an embodiment) will be described in detail with reference to the accompanying drawings as appropriate. First, a description will be given of a high-pressure tank of the present embodiment and a high-pressure to be used in this high-pressure tank.

<<High-Pressure Tank>>

Figure 1:
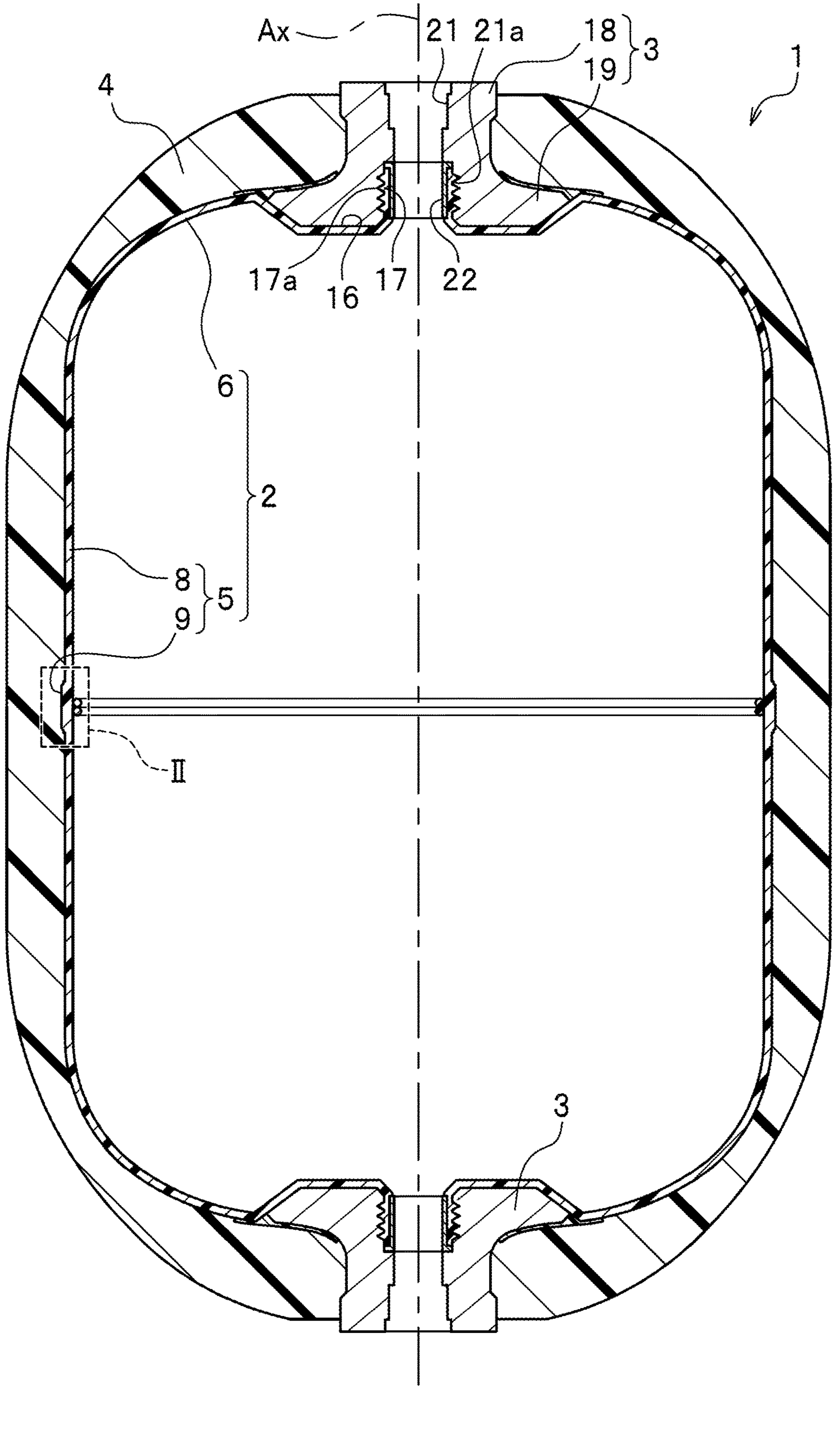
FIG. 1 is a longitudinal cross-sectional view of a high-pressure tank according to an embodiment of the present invention.

FIG. 1 is a longitudinal cross-sectional view of a high-pressure tank 1 according to an embodiment of the present invention.

The high-pressure tank 1 of the present embodiment is assumed to be mounted on a fuel cell vehicle and configured to store hydrogen gas to be supplied to a fuel cell system, for example. However, the high-pressure tank 1 is not limited to this configuration and may be used for other types of the high-pressure gas.

As shown in FIG. 1, the high-pressure tank 1 includes a high-pressure tank liner 2 (hereinafter simply referred to as the "liner 2" as appropriate) to be described later in detail, nozzles 3 joined to this liner 2, and a fiber-reinforced resin layer 4 extending across the liner 2 and the nozzles 3 and covering outer sides thereof.

Each nozzle 3 is assumed to be formed from a metal material such as an aluminum alloy. The nozzle 3 includes a cylindrical nozzle body 18 provided with a supply-exhaust hole 21 on an inner side, and a flange 19 formed on one end side in an axial direction of this nozzle body 18. The supply-exhaust hole 21 communicates with the inside of the high-pressure tank 1 on the one end side where the flange 19 is formed. Moreover, piping (not shown) that communicates with the aforementioned fuel cell system and the like is connected to another end side of the supply-exhaust hole 21.

An inner peripheral surface of the supply-exhaust hole 21 on the one end side of the nozzle body 18 is provided with a screw 21*a* to be threadedly engaged with a screw 17*a* that is formed at a cylindrical portion 17 of the liner 2 to be described later. Moreover, an O-ring (not shown) is fitted between a tip end of the cylindrical portion 17 of the liner 2 and the inner peripheral surface of the supply-exhaust hole 21.

Meanwhile, a cylindrical collar 22 made of a metal material is disposed inside the supply-exhaust hole 21. This collar 22 extends to the liner 2 side from one end side supported by the inner peripheral surface of the supply-exhaust hole 21, and is fitted into the cylindrical portion 17 of the liner 2.

The fiber-reinforced resin layer 4 of the present embodiment is assumed to be obtained by winding prepreg that is formed by impregnating reinforced fibers with a matrix resin in advance around outer peripheral surface of the liner 2 and the nozzles 3, and then curing this matrix resin.

The reinforced fibers in the present embodiment are assumed to be strip-shaped roving 7 (see FIG. 2) to be described later, which is formed by bundling strands each formed from carbon fiber filaments. However, the reinforced fibers are not limited to this structure, and aramid fibers, boron fibers, alumina fibers, silicon carbide fibers, and the like are also applicable, for example.

The matrix resin in the present embodiment is assumed to be a hardened material of a thermosetting resin such as epoxy resin, phenol resin, unsaturated polyester resin, and polyimide resin.

Note that a method of forming the fiber-reinforced resin layer 4 is not limited to the aforementioned method using the prepreg. In this regard, the fiber-reinforced resin layer 4 may be prepared by winding reinforced fibers that are not impregnated with a resin around the liner 2, then impregnating the fibers with the matrix resin, and then hardening the matrix resin, for example.

<<High-Pressure Tank Liner>>

The liner 2 is a hollow body formed from a thermoplastic resin. Examples of the thermoplastic resin include polyamide resin and polyethylene resin. However, the thermoplastic resin is not limited to these examples.

The liner 2 of the present embodiment includes a body portion 5 formed from a cylindrical body, and mirror portions 6 integrally formed at two ends of this body portion 5.

The body portion 5 includes a general part 8 formed with a predetermined outside diameter and constitutes the majority in an axial direction Ax of the body portion 5, and a diameter-expanded part 9 formed at a central part in the axial direction Ax of the body portion 5 with a larger diameter than that of the general part 8.

As will be described later in detail in the following chapter "high-pressure tank liner manufacturing method", the diameter-expanded part 9 is formed by joining ends of a pair of liner half bodies 31 (see FIG. 3A) to each other by welding, and subjecting joint portions 36 (see FIG. 3C) thus obtained to cutting work.

Figure 2:
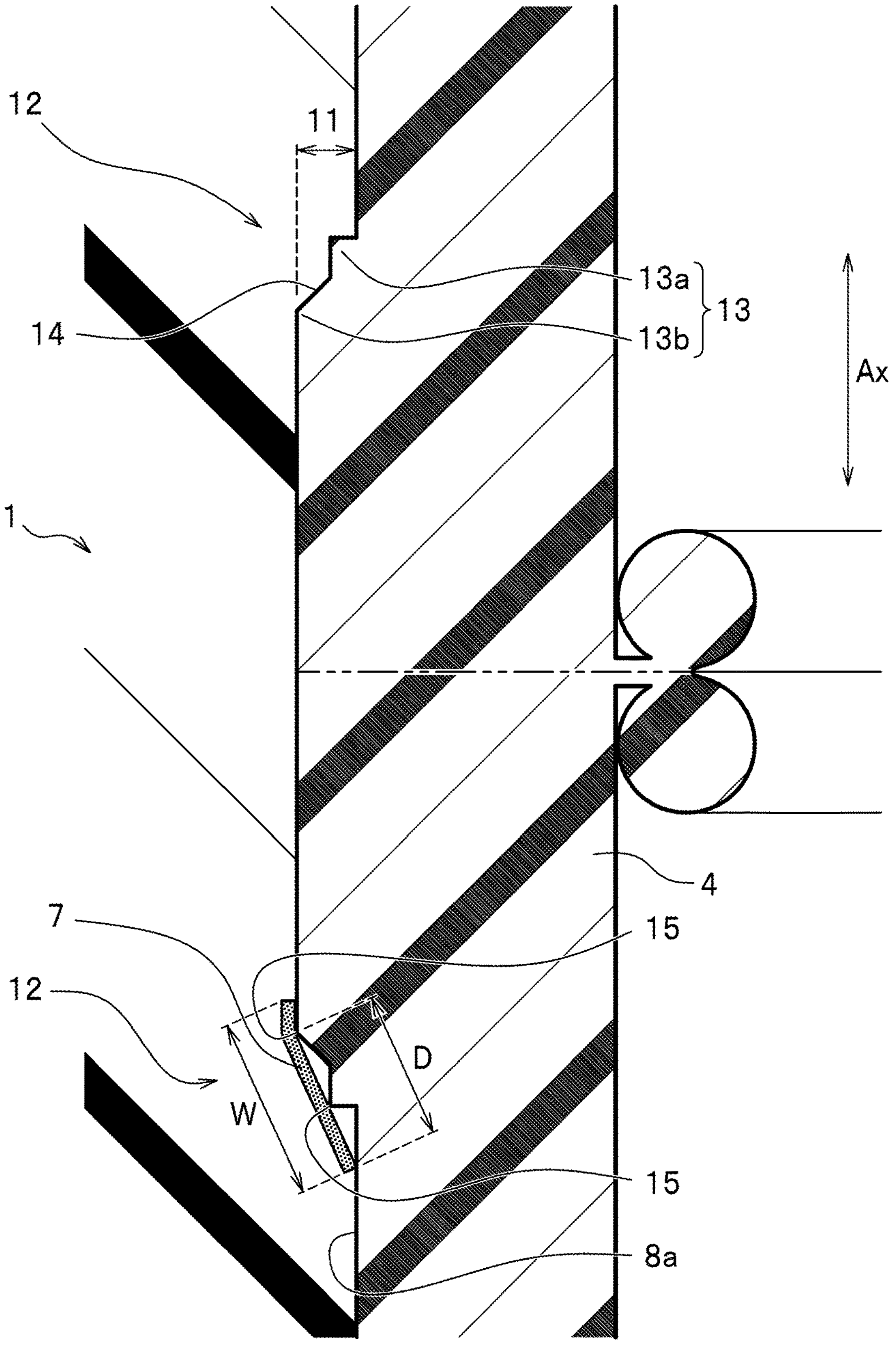
FIG. 2 is a partially enlarged cross-sectional view of a portion II in FIG. 1.

FIG. 2 is a partially enlarged cross-sectional view of a portion II in FIG. 1.

As shown in FIG. 2, a stepped portion 11 formed between the general part 8 and the diameter-expanded part 9 of the body portion 5 is provided with a staircase portion 12 that includes stairs from the general part 8 side toward the diameter-expanded part 9 side. Although the number of stairs in the staircase portion 12 is set to two stairs in the present embodiment, the number of stairs of the staircase portion 12 may also be set to three or more stairs as will be described later.

Meanwhile, of stairs 13 constituting the above-mentioned staircase portion 12, a rising surface 14 of each stair 13*b* except a first stair 13*a* that is formed closest to the general part 8 has an inclined surface.

The rising surface 14 in the present embodiment corresponds to a surface portion equivalent to a riser that rises from a so-called tread in a staircase structure when the general part 8 is regarded as downstairs and the diameter-expanded part 9 is regarded as upstairs. Moreover, the rising surface 14 of the present embodiment is inclined in such a way as to recede gradually from the axis (see reference sign Ax in FIG. 1) of the cylindrical body from the general part 8 toward the diameter-expanded part 9 side.

Reference sign 4 in FIG. 2 denotes the fiber-reinforced resin layer and reference sign 7 therein denotes the roving illustrated with its transverse section, which extends in a circumferential direction of the body portion 5 on the staircase portion 12.

Moreover, the staircase portion 12 is formed such that a distance D from a corner 15 on the diameter-expanded part 9 side of the stepped portion 11 to a peripheral surface 8*a* of the general part 8 while passing through another corner 15 of the stair 13 formed between the diameter-expanded part 9 and the general part 8 is shorter than a lateral width W of the roving 7 as shown in FIG. 2.

As shown in FIG. 1, the mirror portion 6 is a flat bowl-like body that converges in such a way that its diameter is gradually reduced from the body portion 5 side to the outside in the axial direction Ax.

A central part in a radial direction of the mirror portion 6 includes a recess 16 that is recessed in such a way as to correspond to the shape of the flange 19 of the nozzle 3.

Meanwhile, the above-described cylindrical portion 17 is formed at a central part of the recess 16 in such a way as to project into the supply-exhaust hole 21 of the nozzle 3. Moreover, the screw 17*a* threadedly engaged with the screw 21*a* of the supply-exhaust hole 21 as mentioned above is formed on an outer peripheral surface of the cylindrical portion 17.

<<High-Pressure Tank Liner Manufacturing Method>>

Next, a method of manufacturing the liner 2 (see FIG. 1) will be described.

Figure 3A:
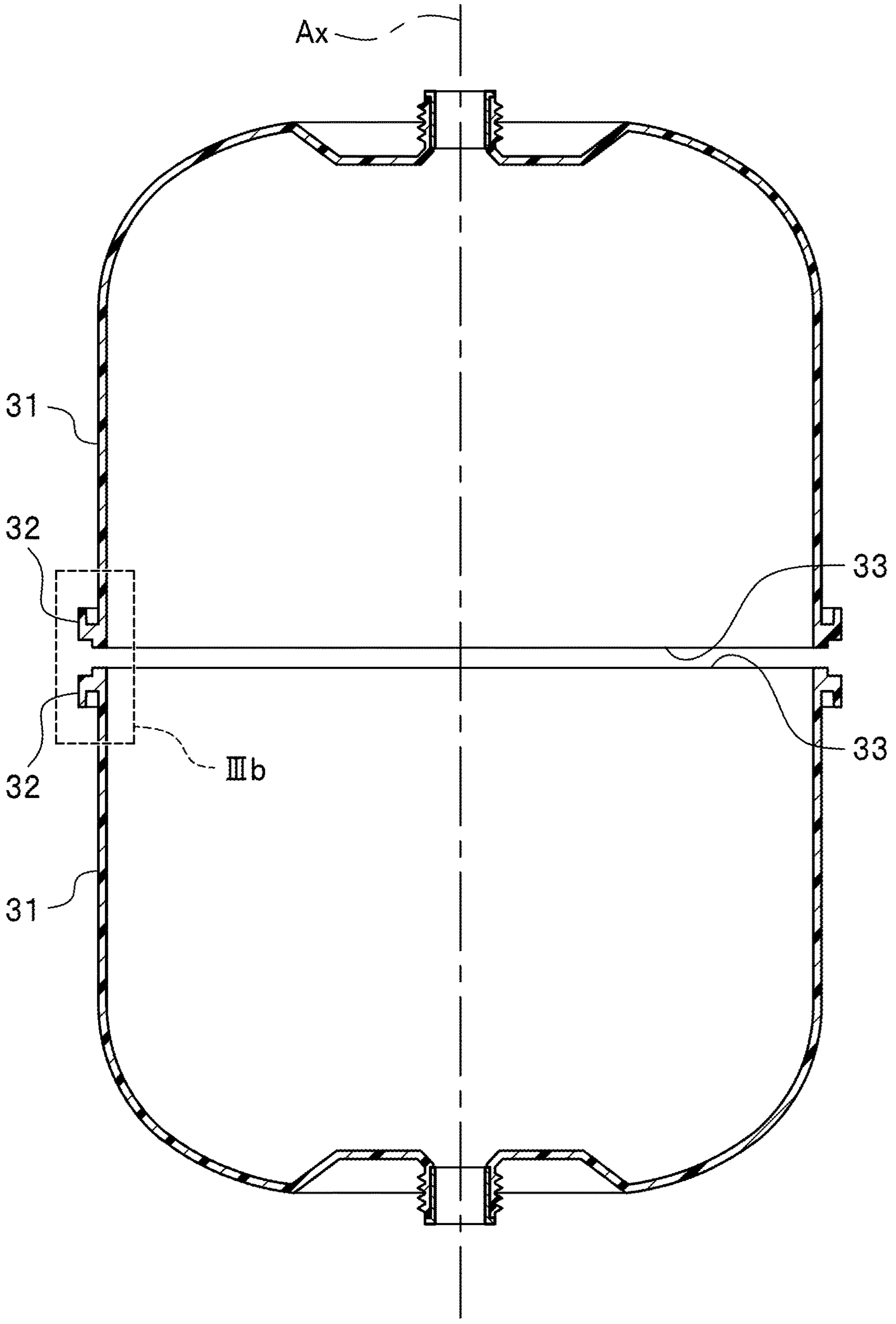
FIG. 3A is a longitudinal cross-sectional view of a pair of liner half bodies used in a high-pressure tank liner manufacturing method according to the embodiment of the present invention.
Figure 3B:
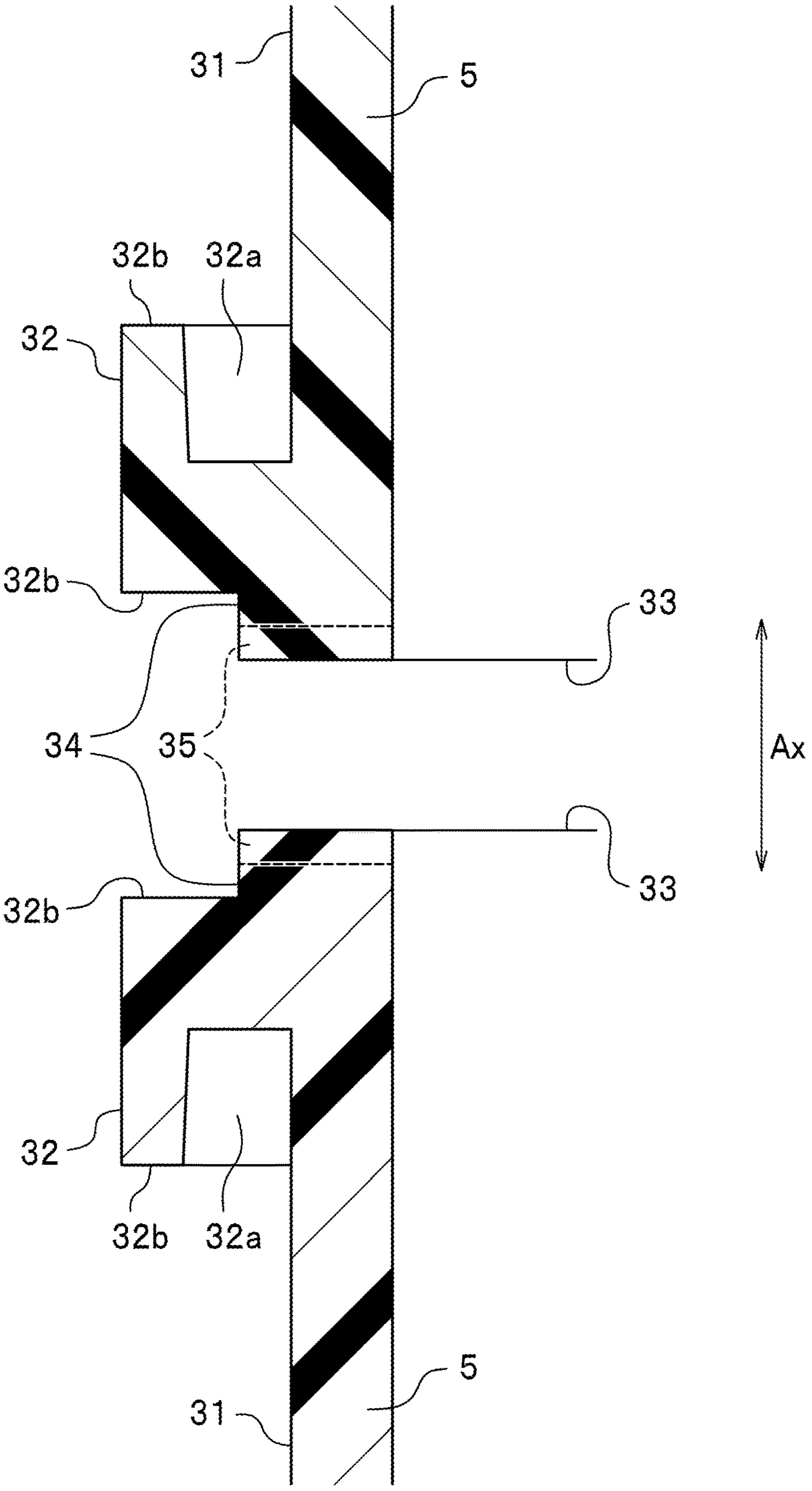
FIG. 3B is a partially enlarged cross-sectional view of a portion IIIb in FIG. 3A.
Figure 3C:
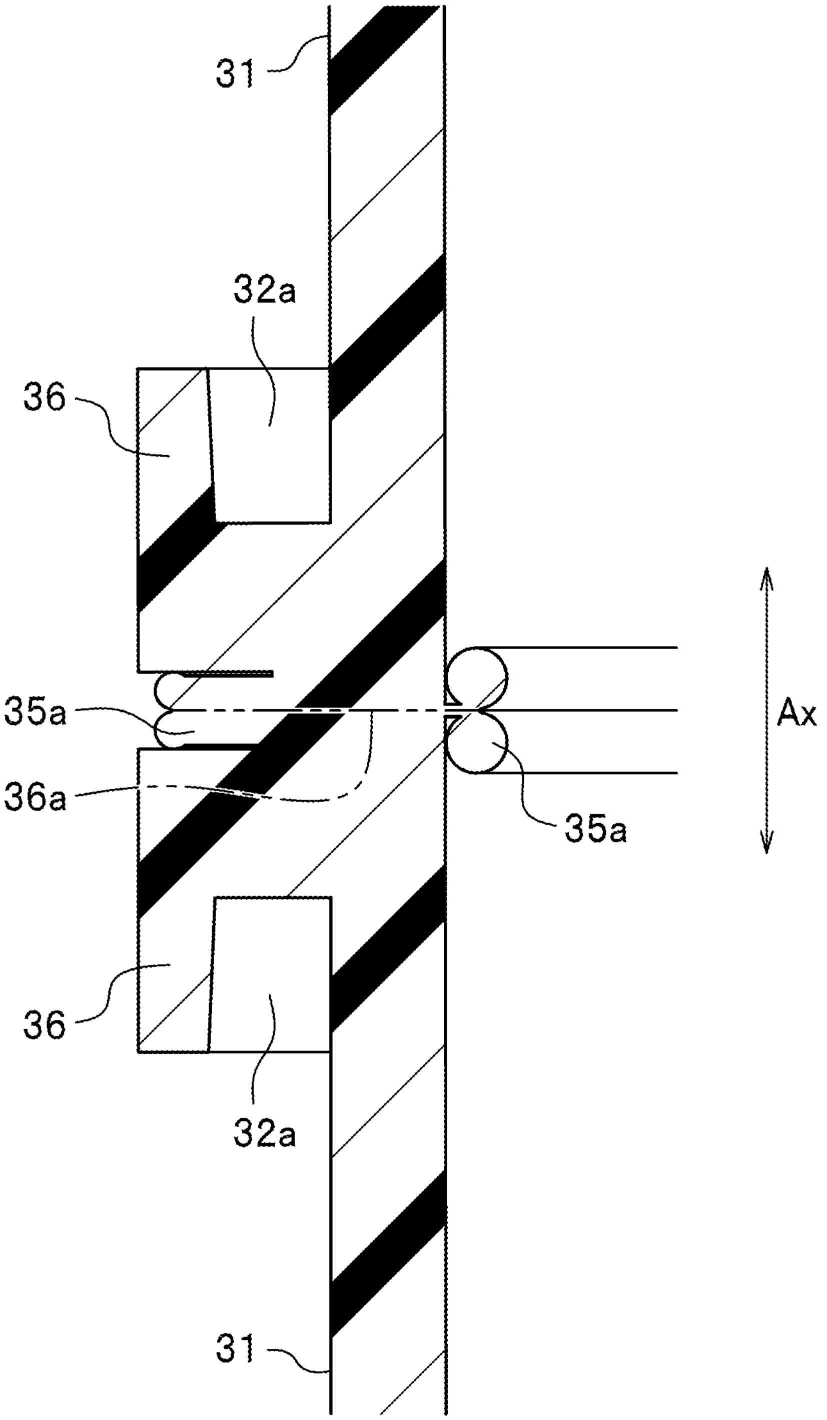
FIG. 3C is a partially enlarged cross-sectional view of joint portions where the pair of liner half bodies shown in FIG. 3A are joined to each other by welding.
Figure 3D:
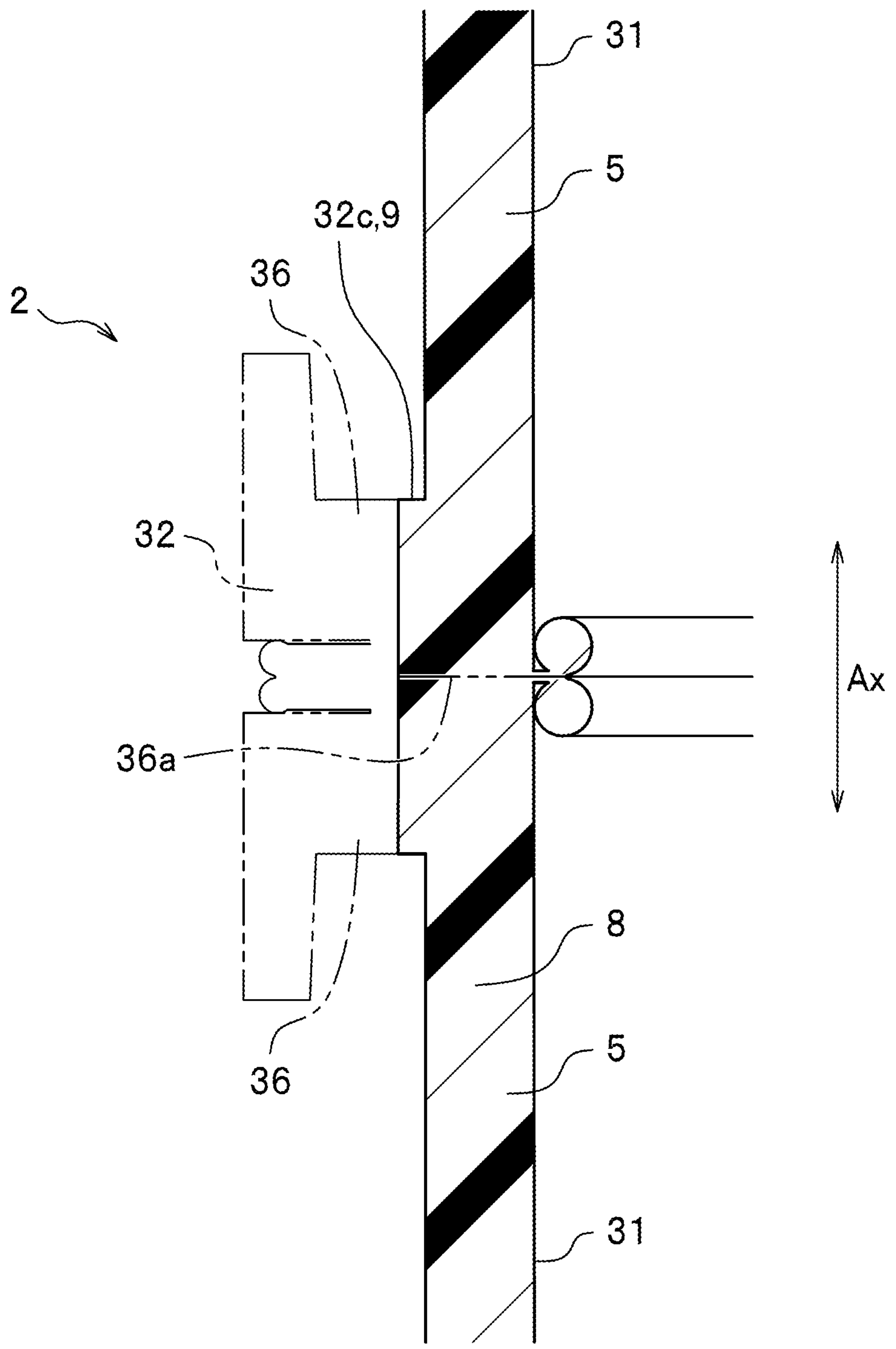
FIG. 3D is a partially enlarged cross-sectional view of a diameter-expanded part of a liner 2 formed by subjecting the joint portion in FIG. 3C to cutting work.
Figure 3E:
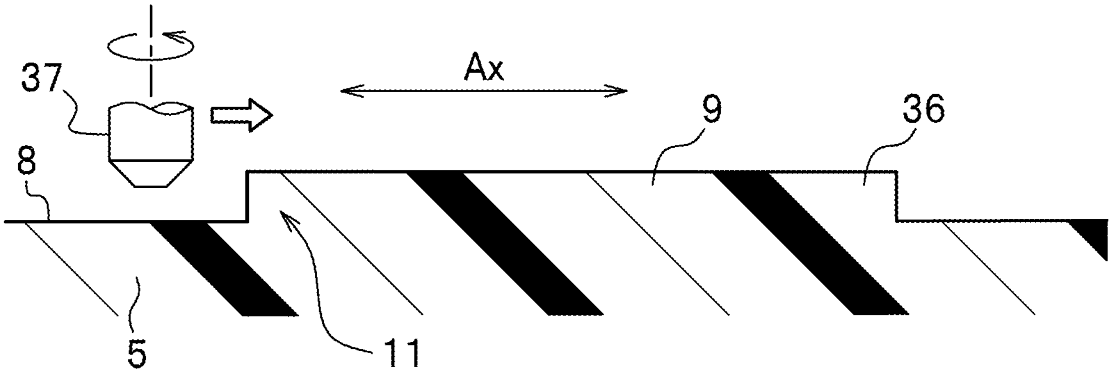
FIGS. 3E to 3G show explanatory diagrams of a process to subject the diameter-expanded part shown in FIG. 3D to stairs formation work.
Figure 3F:
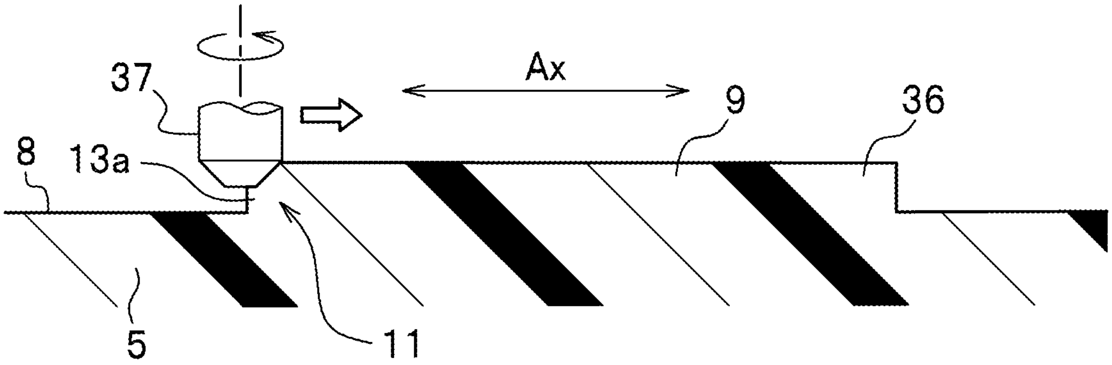
Figure 3G:
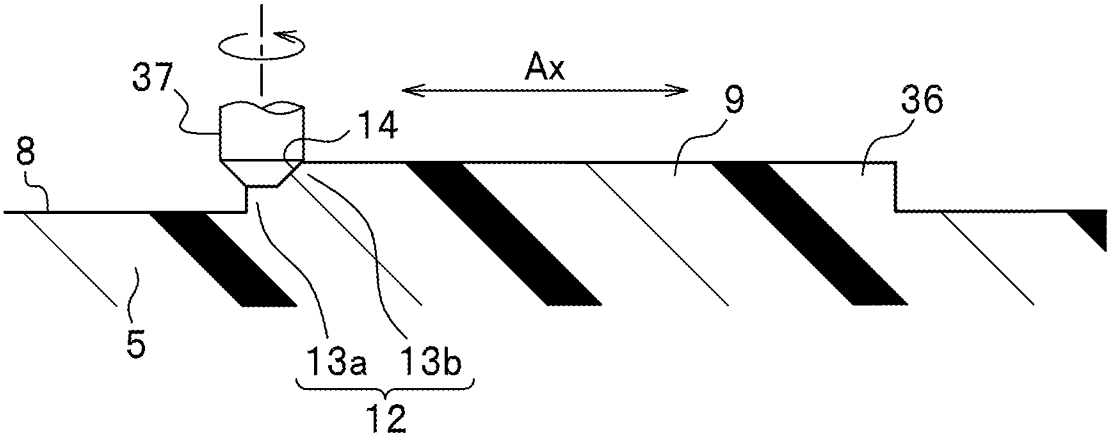

FIG. 3A is a longitudinal cross-sectional view of the pair of liner half bodies 31 used in a method of manufacturing the liner 2 (see FIG. 1) according to the present embodiment. FIG. 3B is a partially enlarged cross-sectional view of a portion IIIb in FIG. 3A. FIG. 3C is a partially enlarged cross-sectional view of joint portions 36 where the pair of liner half bodies 31 shown in FIG. 3A are joined to each other by welding. FIG. 3D is a partially enlarged cross-sectional view of the diameter-expanded part 9 of the liner 2 formed by subjecting the joint portions 36 in FIG. 3C to cutting work. FIGS. 3E to 3G show explanatory diagrams of a process to subject the diameter-expanded part 9 shown in FIG. 3D to stair formation work.

As shown in FIGS. 3A to 3G, the method of manufacturing the liner 2 (see FIG. 1) according to the present embodiment mainly includes a preparing step of preparing the liner half bodies 31, a joining step of integrally joining the liner half bodies 31 to each other by welding, and a cutting step of subjecting the joint portions 36 between the integrated liner half bodies 31 to cutting work.

As shown in FIG. 3A, the pair of liner half bodies 31 are prepared in the above-mentioned preparing step.

Each liner half body 31 has substantially the same shape as a shape of the liner 2 shown in FIG. 1, which is cut into half at the central part in the axial direction, except that the liner half body 31 is provided with a flange 32 to be described below.

The above-described liner half body 31 can be formed in accordance with an injection molding method or a blow molding method.

As shown in FIG. 3B, the flange 32 and a projecting end 34 provided with a melting margin 35 to be described later in detail are formed at each of openings 33 of the liner half bodies 31 to be opposed to each other.

The flange 32 is an annular body that is formed integrally and coaxially with the body portion 5 of the liner half body 31 in such a way as to bulge out in the radial direction from the body portion 5.

The flange 32 is provided with a circumferential groove 32*a*.

This circumferential groove 32*a* is formed in such a way as to extend in the circumferential direction in a flange surface 32*b* that rises from a peripheral surface of body portion 5 of the liner half body 31. In other words, the circumferential groove 32*a* is formed in one of a pair of flange surfaces 32*b* provided in such a way as to be arranged in the axial direction of the liner half body 31, which is located away from the opening 33 of the liner half body 31.

A pressing jig (not shown) is fitted into the above-described circumferential groove 32*a*. Moreover, this pressing jig is configured to press the liner half bodies 31, which are disposed such that the openings 33 are opposed to each other, with a predetermined load as shown in FIG. 3A.

As shown in FIG. 3B, the projecting end 34 is an annular body provided coaxially with the body portion 5, which is molded integrally with an end surface on the opening 33 side of the liner half body 31.

An outside diameter of the projecting end 34 is set larger than an outside diameter of the body portion 5 of the liner half body 31 and smaller than an outside diameter of the flange 32.

Meanwhile, an inside diameter of the projecting end 34 is set equal to an inside diameter of the liner half body 31.

Moreover, a thickness of the projecting end 34 in the axial direction Ax of the liner half body 31 is larger than each of the melting margins 35 between the liner half bodies 31 at the time of welding to be described later.

Next, in the step of joining the liner half bodies 31 to each other, the liner half bodies 31 are joined to each other by heating and melting the melting margins 35 of the projecting ends 34 shown in FIG. 3B.

A method of melting the melting margins 35 in the present embodiment is assumed to be a method of heating the projecting ends 34 with a heater, a method of using frictional heat between the liner half bodies 31, and the like. Incidentally, the frictional heat between the liner half bodies 31 can be generated by relatively displacing the liner half bodies 31 by means of vibration or the like while pressing the liner half bodies 31 against each other with application of the predetermined load from the above-mentioned pressing jig (not shown).

Then, in this joining step, the liner half bodies 31 are pressed against each other as shown in FIG. 3C while applying the predetermined load by using the pressing jig (not shown), thereby causing melted materials 35*a* of the melting margins 35 (see FIG. 3B) to flow in a direction intersecting with a pressing direction (the axial direction Ax) of the liner half bodies 31. Thus, the melted materials 35*a* of the liner half bodies 31 are melted together at a welding surface 36*a* indicated with a phantom line (a chain double-dashed line). Then, the liner half bodies 31 are integrated and connected to each other at the welding surface 36*a* as the melted materials 35*a* are cooled down.

Next, in the step of cutting the integrated liner half bodies 31, the flanges 32 at the joint portions 36 are removed by cutting work except base portions 32*c* thereof as shown in FIG. 3D.

Hence, the remaining base portion 32*c* form the above-described diameter-expanded part 9 of the liner 2.

Meanwhile, in this cutting step, the staircase portion 12 including the stairs is formed by cutting the stepped portion 11 formed between the general part 8 and the diameter-expanded part 9 of the body portion 5 as shown in FIGS. 3E to 3G. More precisely, a rotary tool provided with a cutting tool head 37 in a truncated cone shape approaches the stepped portion 11 along the axial direction Ax of the body portion 5 as shown in FIG. 3E.

Then, the cutting tool head 37 starts cutting the stepped portion 11 as shown in FIG. 3F. In this instance, a height of the first stair 13*a* of the staircase portion 12 is determined by a distance of the cutting tool head 37 from the general part 8 of the body portion 5.

Subsequently, the cutting tool head 37 further proceeds with cutting as shown in FIG. 3G, thus forming the staircase portion 12 provided with the stairs including the first stair 13*a* and the stair 13*b* that is provided with the rising surface 14.

Meanwhile, the high-pressure tank 1 is formed by winding the roving 7 made of the reinforced fibers around the body portion 5 of the liner 2 inclusive of the above-mentioned staircase portion 12 as shown in a lower diagram in FIG. 2. Here, the distance D of the staircase portion 12 is shorter than the lateral width W of the roving 7 as mentioned above.

Moreover, the series of the manufacturing process of the liner 2 (see FIG. 1) of the present embodiment is completed by providing the diameter-expanded part 9 with the above-mentioned staircase portion 12.

<<Operation and Effects>>

Next, the operation and effects of the high-pressure tank liner 2, the high-pressure tank liner manufacturing method, and the high-pressure tank 1 of the present embodiment will be described.

Figure 4A:
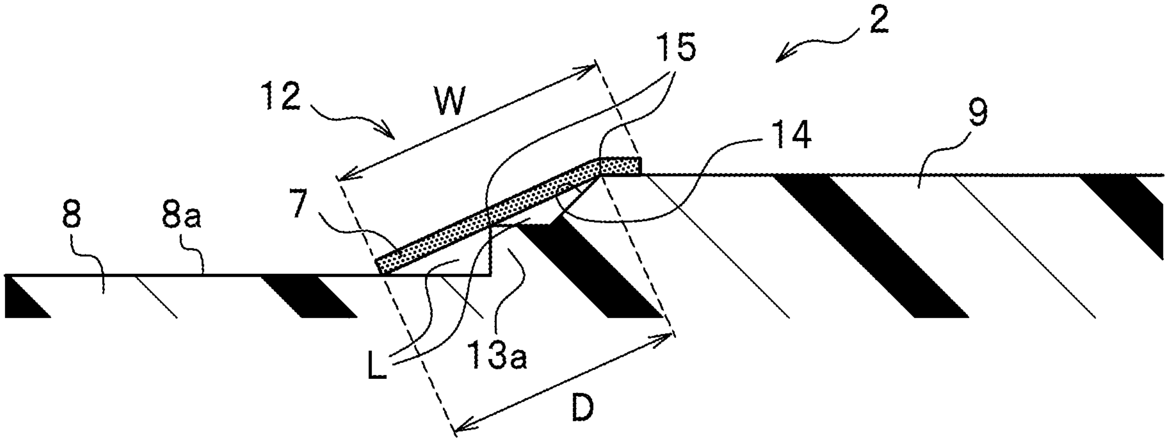
FIG. 4A is a partially enlarged cross-sectional view schematically showing an aspect of roving wound around a staircase portion of the high-pressure tank liner according to the embodiment of the present invention.
Figure 4B:
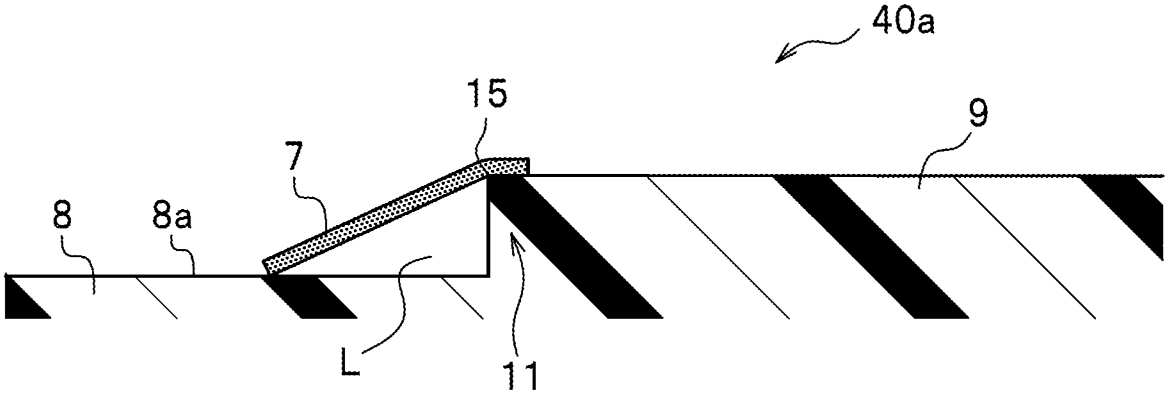
FIG. 4B is a partially enlarged cross-sectional view schematically showing an aspect of roving wound around a stepped portion of a high-pressure tank liner according to a first comparative example.
Figure 4C:
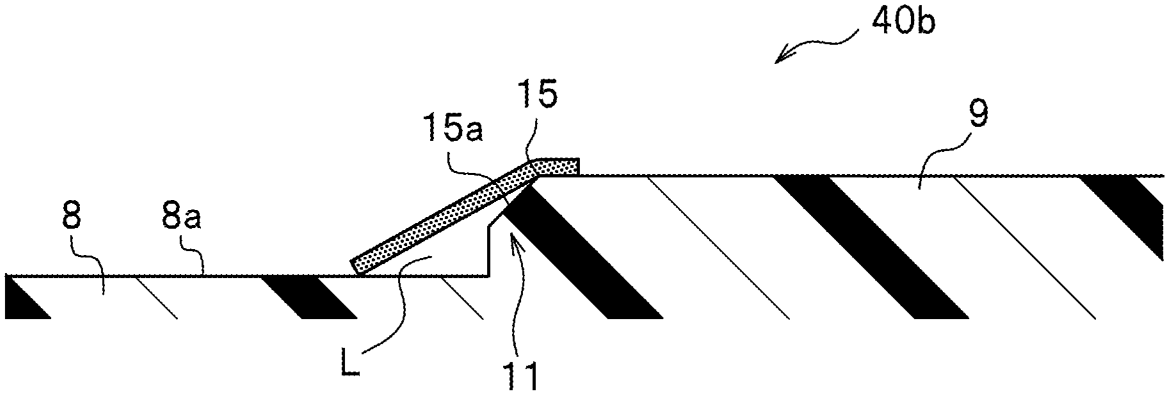
FIG. 4C is a partially enlarged cross-sectional view schematically showing an aspect of roving wound around a stepped portion of a high-pressure tank liner according to a second comparative example.

FIG. 4A is a partially enlarged cross-sectional view schematically showing an aspect of the roving 7 as the reinforced fibers wound around the staircase portion 12 of the liner 2 according to the embodiment. FIG. 4B is a partially enlarged cross-sectional view schematically showing an aspect of the roving 7 as the reinforced fibers wound around the stepped portion 11 of a liner 40*a* according to a first comparative example. FIG. 4C is a partially enlarged cross-sectional view schematically showing an aspect of the roving 7 as the reinforced fibers wound around the stepped portion 11 of a liner 40*b* according to a second comparative example.

Here, a description will be given of the liner 40*a* according to the first comparative example and the liner 40*b* according to the second comparative example to begin with.

As shown in FIG. 4B, the liner 40*a* according to the first comparative example is formed the same as the liner 2 of the present embodiment except that the staircase portion 12 (FIG. 4A) including the stairs is not formed at the stepped portion 11 between the general part 8 and the diameter-expanded part 9.

When the roving 7 is would around the stepped portion 11 of the above-mentioned liner 40*a*, the roving 7 develops a gap L on the general part 8 side of the liner 40*a*. Meanwhile, when the roving 7 with application of prescribed tension is wound on the stepped portion 11 in the liner 40*a*, the corner 15 of the diameter-expanded part 9 may intrude between the strands (not shown) that form the roving 7, whereby the strands may cause unevenness.

In the meantime, as shown in FIG. 4C, the liner 40*b* according to the second comparative example is provided with a chamfered portion 15*a* (a C surface) at a portion corresponding to the corner 15 (see FIG. 4B) of the liner 40*a* (see FIG. 4B) according to the first comparative example.

When the roving 7 is would around the stepped portion 11 of the above-mentioned liner 40*b*, the roving 7 develops a gap L on the general part 8 side of the liner 40*b* as with the liner 40*a* (see FIG. 4B) according to the first comparative example. Moreover, the corner 15 of the stepped portion 11 may possibly cause unevenness of the strands (not shown).

Incidentally, in the conventional liner (see WO2019/131737, for example), the welding surface 36*a* (see FIG. 3C) may often meander due to processing error. For this reason, one end side of the stepped portions 11 formed at two ends in the axial direction Ax of the diameter-expanded part 9 is formed into the chamfered portion 15*a* (see FIG. 4B), while the other end is formed into the corner 15 (see FIG. 4B) while retaining the stepped portion 11.

On the other hand, according to the liner 2 of the present embodiment, the distance D of the staircase portion 12 including the stairs is shorter than the lateral width W of the roving 7 as shown in FIG. 4A.

According to the above-described liner 2, the roving 7 on the staircase portion 12 with application of the prescribed tension is supported by three points of the corner 15 on the diameter-expanded part 9 side, the peripheral surface 8*a* of the general part 8, and the corner 15 of the first stair 13*a* constituting the staircase portion 12. As a consequence, a reactive force that the roving 7 with application of the prescribed tension receives from the liner 2 side is distributed to these three points and the unevenness of the strands (not shown) is suppressed.

Moreover, according to the above-described liner 2, the gap L of the roving 7 at the step between the general part 8 and the diameter-expanded part 9 of the liner 2 is reduced by providing the diameter-expanded part 9 with the staircase portion 12 including the stairs.

Meanwhile, the rising surface 14 in the liner 2 of the present embodiment is formed into the inclined surface. Accordingly, the corner 15 of the stair 13*b* except the first stair 13*a* is formed into an obtuse angle, whereby a wedge effect of the corner 15 intruding between the strands (not shown) constituting the roving 7 is reduced as compared to the case of the liner (see FIG. 4B) according to the first comparative example. As a consequence, the unevenness of the strands (not shown) is suppressed more reliably.

Moreover, since the rising surface 14 of the liner 2 of the present embodiment is formed into the inclined surface, the gap L of the roving 7 relative to the liner 2 at the stepped portion 11 is further reduced.

The embodiment of the present invention has been described above. It is to be noted, however, that the present invention is not limited to the above-described embodiment but can be embodied in various other modes.

The above-described embodiment has exemplified the liner 2 including the staircase portion 12 provided with two stairs, and the high-pressure tank 1 including this liner 2 (see FIG. 2).

However, the number of stairs in the staircase portion 12 of the liner 2 is not limited to this configuration, and it is possible to provide three or more stairs.

Figure 5A:
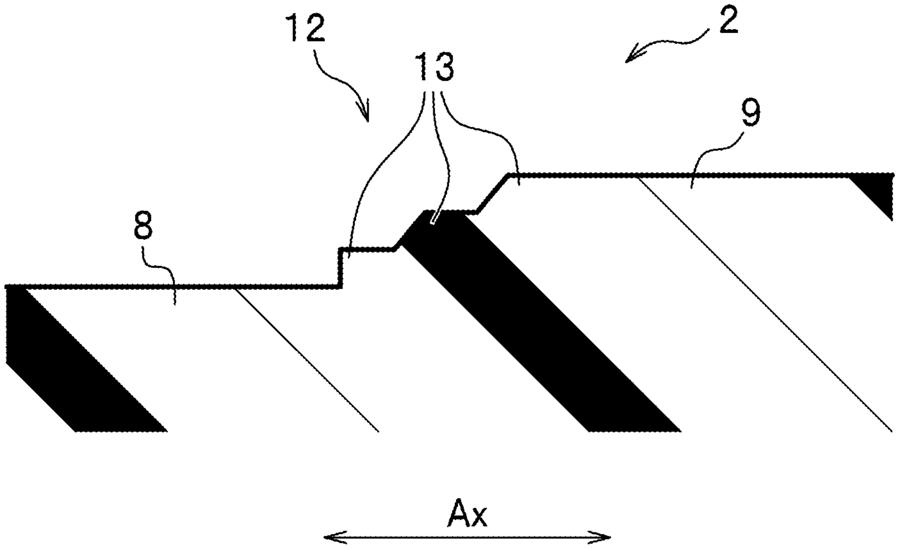
FIG. 5A is a partially enlarged cross-sectional view of a high-pressure tank liner according to a first modified example.

FIG. 5A is a partially enlarged cross-sectional view of the liner 2 according to a first modified example.

As shown in FIG. 5A, the liner 2 according to the first modified example is formed the same as the liner 2 (see FIG. 1) of the above-described embodiment except that the number of stairs in the staircase portion 12 is set to three stairs.

According to the above-described liner 2 of the first modified example, the number of supporting points of the liner 2 to support the roving 7 (see FIG. 2) is further increased in accordance with the number of stairs. This configuration further suppresses the gap L (see FIG. 4A) of the roving 7 (see FIG. 4A) relative to the liner 2 and the unevenness of the strands.

Figure 5B:
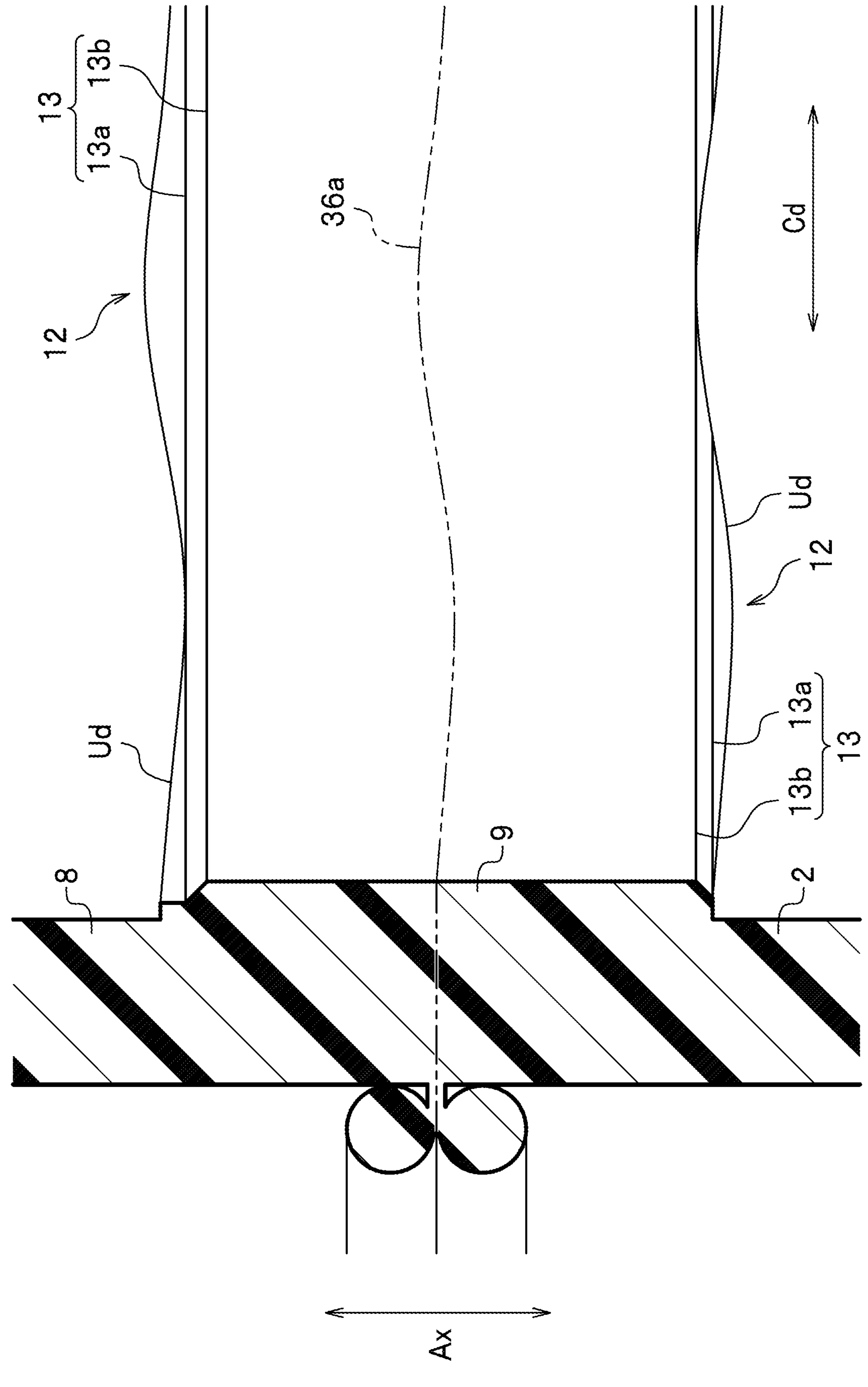
FIG. 5B is a configuration explanatory diagram of a high-pressure tank liner according to a second modified example.

FIG. 5B is a configuration explanatory diagram of the liner 2 according to a second modified example. This FIG. 5B is a development diagram in which the cross-section and the peripheral surface of the liner 2 are depicted on the same plane. Note that illustration of the magnitude and the shape of waviness Ud shown in FIG. 5B is exaggerated for the convenience of description of this modified example, and is therefore different from reality.

As shown in FIG. 5B, the staircase portion 12 of the liner 2 according to the second modified example is alternately formed on one end side and another end side in the axial direction Ax of the diameter-expanded part 9 along a circumferential direction Cd of the diameter-expanded part 9.

In FIG. 5B, reference sign Ud denotes the waviness formed on the one end side and the other end side in the axial direction Ax of the diameter-expanded part 9 as a consequence of meandering of the welding surface 36*a*. In other words, the waviness Ud is formed by the diameter-expanded part 9 that meanders along the circumferential direction Cd of the diameter-expanded part 9. Moreover, portions in which the first stair 13*a* is formed and portions in which the first stair 13*a* is not formed come into being alternately at the one end and the other end in the axial direction Ax of the diameter-expanded part 9 in accordance with a cycle of this waviness Ud. Accordingly, the staircase portion 12 is alternately formed along the circumferential direction Cd to the liner 2 according to the second modified example.

According to the liner 2 of the second modified example as described above, the gap L (see FIG. 4A) of the roving 7 (see FIG. 4A) and the unevenness of the strands (not shown) can be suppressed by using the staircase portion 12 formed on the one end side or the other end side of the diameter-expanded part 9.

The above-described embodiment has exemplified the structure in which the staircase portions 12 of the liner 2 are formed on two ends in the axial direction Ax of the cylindrical body of the diameter-expanded part 9 (see FIG. 2). Here, the staircase portion 12 of the liner 2 only needs to be formed at least on one end side in the axial direction of the cylindrical body of the diameter-expanded part 9.

Figure 5C:
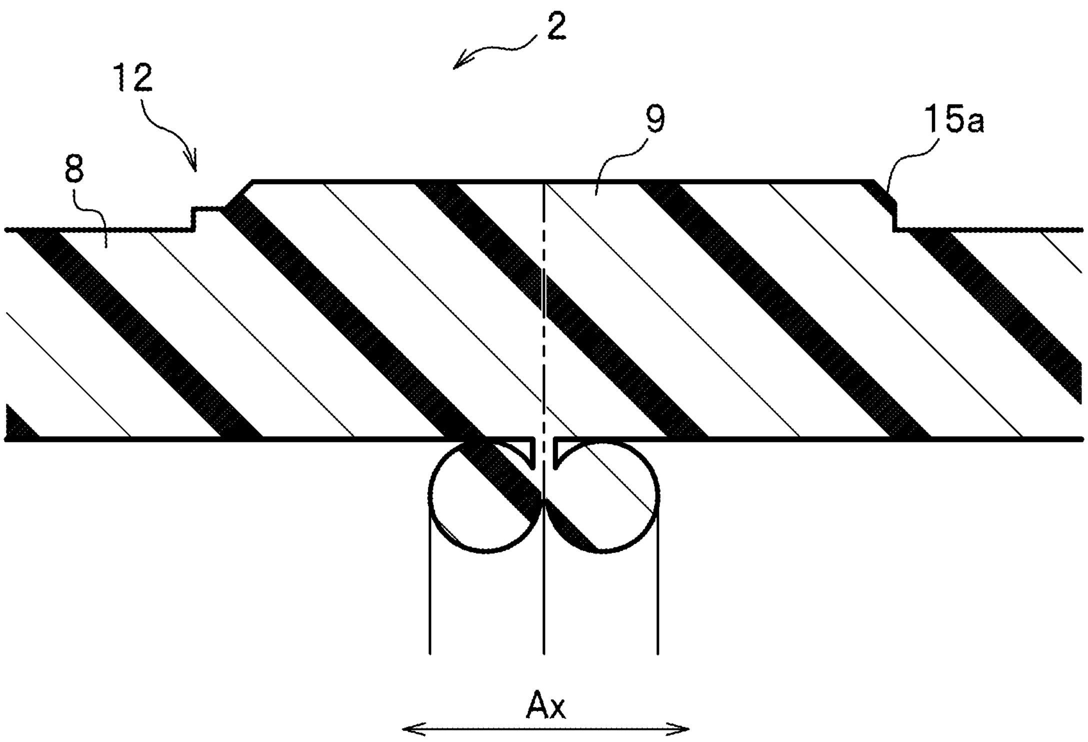
FIG. 5C is a partially enlarged cross-sectional view of a high-pressure tank liner according to a third modified example.

FIG. 5C is a partially enlarged cross-sectional view of the liner 2 according to a third modified example.

As shown in FIG. 5C, in the liner 2 according to the third modified example, the staircase portion 12 is formed only on one end side in the axial direction Ax of the cylindrical body of the diameter-expanded part 9. Meanwhile, the chamfered portion 15*a* (the C surface) is formed on the other end side of the diameter-expanded part 9.

According to the above-described liner 2 of the third modified example, the staircase portion 12 formed on the one end side can suppress the gap L (see FIG. 4A) of the roving 7 (see FIG. 4A) and the unevenness of the strands (not shown). Meanwhile, the chamfered portion 15*a* (the C surface) formed on the other end side reduces a load on the filaments (not shown).

What is claimed is:

1. A high-pressure tank comprising:

a high-pressure tank liner including:

a body portion formed from a cylindrical body;

a diameter-expanded part formed into a cylindrical body at the body portion with a larger diameter than an outside diameter of a general part of the body portion; and a staircase portion including two or more stairs and formed at a stepped portion between the general part and the diameter-expanded part of the body portion, wherein the staircase portion includes a plurality of step surfaces extending in an axial direction of the body portion continuously from an external surface of the general part and a surface connecting the general part with a step surface located closest to the general part among the plurality of step surfaces, and a fiber-reinforced resin layer formed from reinforced fibers and provided in such a way as to cover an outer side of the high-pressure tank liner, wherein a distance from a corner on the diameter-expanded part side of the stepped portion to a peripheral surface of the general part while passing through corners of the two or more stairs constituting the staircase portion is shorter than a lateral width of roving formed from the reinforced fibers arranged in such a way as to extend in a circumferential direction of the body portion.

2. The high-pressure tank according to claim 1, wherein the staircase portion is formed at least on one end side in an axial direction of the cylindrical body of the diameter-expanded part.

3. The high-pressure tank according to claim 1, wherein the staircase portion is formed alternately on one end side and another end side in an axial direction of the cylindrical body of the diameter-expanded part along a circumferential direction of the diameter-expanded part.

4. The high-pressure tank according to claim 1, wherein of the two or more stairs constituting the staircase portion, a rising surface of each stair except a first stair formed closest to the general part, the rising surface rising in a direction to recede from an axis of the cylindrical body, is formed into an inclined surface inclined in such a way as to recede gradually from the axis of the cylindrical body from the general part side toward the diameter-expanded part side.

5. The high-pressure tank according to claim 1, wherein a step-up direction of the stepped portion is parallel to a longitudinal direction of the liner, and wherein an (n+1)-th step of the stepped portion is disposed closer to a longitudinal center of the liner than an n-th step in the longitudinal direction of the liner.

* * * * *